United States Patent [19]
Matheson

[11] 4,145,312
[45] Mar. 20, 1979

[54] POLYMERIZATION CATALYST

[75] Inventor: Ian A. Matheson, Edinburgh, Scotland

[73] Assignee: BP Chemicals Limited, London, England

[21] Appl. No.: 798,179

[22] Filed: May 18, 1977

[30] Foreign Application Priority Data
May 24, 1976 [GB] United Kingdom ............... 21330/76
Nov. 25, 1976 [GB] United Kingdom ............... 49183/76

[51] Int. Cl.$^2$ ........................... C08F 4/02; C08F 4/10
[52] U.S. Cl. ........................... 252/429 B; 252/429 C; 252/430; 526/124; 526/125
[58] Field of Search ............... 252/429 B, 429 C, 430, 252/431 R

[56] References Cited
U.S. PATENT DOCUMENTS
3,116,274  12/1963  Boehm et al. ................ 252/429 B X
3,163,611  12/1964  Andersen et al. ................ 252/429 B FOREIGN PATENT DOCUMENTS
49-14864  4/1974  Japan.

Primary Examiner—Patrick Garvin
Attorney, Agent, or Firm—Brooks, Haidt, Haffner & Delahunty

[57] ABSTRACT

A supported Ziegler catalyst prepared by a process comprising treating a magnesium containing support material with a titanium compound in the presence of a tin compound having the formula $Sn(OR')_m X_{4-m}$ wherein R' is a hydrocarbyl radical, m is 0–4 and X is halogen. The catalyst is used with a conventional co-catalyst e.g. a trialkyl aluminium compound.

13 Claims, No Drawings

POLYMERIZATION CATALYST

The present invention relates to a supported Ziegler polymerisation catalyst and to the use of the catalyst in the polymerisation of 1-olefins.

It has long been known that olefins such as ethylene can be polymerised by contacting them under polymerisation conditions with a catalyst comprising a transition metal compound, e.g. titanium tetrachloride and co-catalyst or activator, e.g. an organometallic compound such as triethyl aluminium. Catalysts of this type are generally referred to as Ziegler catalysts and will be referred to as such throughout this specification. The catalyst and co-catalyst together will be referred to as activated Ziegler catalysts. The deposition of such catalysts on support materials such as silicon carbide, calcium phosphate, magnesium carbonate or sodium carbonate is also known. UK Patent Specification No. 969,764 discloses a catalyst of the supported Ziegler type comprising (a) the product of reaction carried out in an inert liquid hydrocarbon under certain conditions between a halide or oxyhalide compound of a group IVa, Va, VIa, metal of the Periodic System, Mendeleev's version, and a dry (as therein defined), finely divided particulate inorganic oxide other than silica, alumina or alumina-silica having an average particle size of less than 1 micron and having surface hydroxyl groups thereon, and (b) (as co-catalyst) an organometallic compound or a metal hydride as therein defined. Examples of suitable inorganic oxides are said to be titania, zirconia, thoria and magnesia.

It is an object of the present invention to provide an improved supported Ziegler catalyst.

Accordingly the present invention provides a supported Ziegler catalyst prepared by a process comprising treating a magnesium-containing support material containing at least some hydroxyl groups with a halogen-containing titanium compound in the presence of a tin compound having the formula $Sn(OR')_m X_{4-m}$ wherein R' is a hydrocarbyl radical, m is 0–4 and X is halogen.

The magnesium-containing support material employed in the process of the present invention can be any such support material suitable for making supported Ziegler catalysts. Examples of magnesium-containing support materials are magnesium oxide, magnesium hydroxide and magnesium hydroxychloride. Magnesium oxide is preferred. Magnesium oxide obtained by thermally decomposing magnesium hydroxide is particularly preferred.

The magnesium-containing support material suitably has a particle size greater than 1 micron, preferably in the range 1 to 500 microns and most preferably in the range 1 to 150 microns. Magnesium oxides having a surface area in the range 10 to 250 sq meters/gramme and a hydroxyl group content of < 0.2 OH groups per Mg atom are particularly preferred.

The support material must be substantially free from moisture.

The halogen-containing titanium compound employed in the present invention is suitably a halide, halo-alkoxide or oxyhalide of titanium. Particularly preferred are compounds having the general formula $Ti(OR)_n(Cl)_{4-n}$ wherein n has any value from 0 to 3 inclusive and R is a hydrocarbon group, preferably an alkyl group containing 1 to 6 carbon atoms; for example, titanium tetrachloride $Ti(O C_2H_5)_2Cl_2$, $Ti(OiPr)Cl_3$ or mixtures thereof.

The titanium compound is believed to react with the magnesium-containing support material or to become chemisorbed thereon but the precise nature of the reaction is unknown.

The quantity of titanium compound employed is suitably sufficient to give a concentration of supported titanium in the range 0.1 to 30%, preferably 0.5 to 15% based on the total weight of catalyst.

Where a hydrocarbyl group R' is present in the tin compound it is suitably an alkyl, aryl or mixed alkyl/aryl group. Preferably it is an alkyl group containing 1–6 carbon atoms, for example methyl, ethyl, isopropyl. Where a halogen X is present it is suitably chlorine, bromine or iodine. Chlorine is preferred. The tin compound preferably contains at least one halogen atom. Stannic chloride, trichloro stannic isopropylate, or dichloro stannic di-isopropylate are preferred.

The magnesium-containing support material is treated with the halogen containing titanium compound in the presence of the tin compound. The tin compound may be added to the support material or to the titanium compound or to a mixture of these provided it is present during the treatment. Preferably the tin compound is added to the titanium compound before addition of the support material. The quantity of tin compound employed is suitably in the range 0.2 to $2 \times 10^4$, preferably 1 to $1 \times 10^4$ millimoles per kilogram of support material. Stannic chloride is a liquid and can conveniently be measured out by volume if desired, e.g. from a syringe. It is preferred to employ volumes of stannic chloride in the range 0.1 to 10,000 microliters per 10g of support. Particularly preferred are volumes in the range 0.1 to 50 microliters per 10 g of support, for example 0.5 to 15 microliters per 10g of support.

The magnesium-containing support material may be treated with the titanium compound using any of the known techniques employed in the art of preparing supported Ziegler catalysts. Preferably the titanium compound and the support material are brought together at a temperature in the range 0 to 240° C., most preferably 60° to 140° C. The treatment can be carried out in the presence of inert diluent or a solvent for the titanium compound if desired. When the tin compound employed is stannic chloride and the titanium compound is titanium tetrachloride, the vapours of these compounds can, if desired be passed into the support material, e.g. as a fluidised bed. A particularly preferred method employed in the present invention is to heat the support material with the titanium compound at a temperature in the range 70°–100° C. for ½ to 5 hours in the presence of an inert diluent or a solvent for the titanium compound. Suitable inert diluents (which are in some cases also solvents for the transition metal compound) are, for example, saturated aliphatic hydrocarbons such as petroleum ether, butane, pentane, hexane, heptane, methyl cyclohexane and cyclohexane and aromatic hydrocarbons such as benzene, toluene and xylene.

Excess titanium compounds remaining in the catalyst after the treatment are preferably removed from the catalyst, for example, by solvent washing, filtration, centrifugation, or other convenient techniques which do not have a deleterious effect on the catalyst.

If desired, an electron donor compound, e.g. an alcohol or amine, may be mixed with the titanium compound and the support material during the supporting step. A preferred catalyst according to the invention is obtained by adding the tin compound, for example, stannic chloride to a mixture of titanium tetrachloride and isopropanol and refluxing with the support material.

All stages of the catalyst preparation are preferably carried out in the absence of moisture.

The present invention further provides a process for polymerising 1-olefins comprising contacting, under polymerisation conditions, the monomeric material with the supported Ziegler catalyst of the present invention in the present of a Ziegler catalyst activator.

The polymerisation process according to the present invention can be applied to the polymerisation of 1-olefins e.g. ethylene or propylene or mixtures of olefins, e.g. ethylene with other 1-olefins, for example, propylene, 1-butene, 1-pentene, 1-hexene, 4-methyl pentene-1, 1,3-butadiene or isoprene. The process is particularly suitable for the polymerisation of ethylene or copolymerisation of ethylene with up to 40% weight (based on total monomer) of comonomers, i.e. one or more other 1-olefins.

As is the case with other supported Ziegler catalysts the catalyst of the present invention must be activated with a Ziegler catalyst activator. Ziegler catalyst activators and the methods by which they are used to activate Ziegler catalysts are well-known. Examples of Ziegler catalyst activators are organic derivatives or hydrides of metals of Groups I, II, III and IV of the Periodic Table. Particularly preferred are the trialkyl aluminiums or an alkyl aluminium halide, e.g. triethyl or tributyl aluminium.

The polymerisation conditions can be in accordance with known techniques used in supported Ziegler polymerisation. The polymerisation can be carried out in the gaseous phase or in the presence of a dispersion medium in which the monomer is soluble. As a liquid dispersion medium use can be made of an inert hydrocarbon which is liquid under the polymerisation conditions, or of the monomer or monomers themselves maintained in the liquid state under their saturation pressure. The polymerisation can, if desired, be carried out in the presence of hydrogen gas or other chain transfer agent to vary the molecular weight of the produced polymer.

The polymerisation is preferably carried out under conditions such that the polymer is formed as solid particles suspended in a liquid diluent. Generally the diluent is selected from paraffins and cycloparaffins having from 3-30 carbon atoms per molecule. Suitable diluents include, for example, isopentane, isobutane, and cyclohexane. Isobutane is preferred.

The polymerisation can be carried out under continuous or batch conditions.

Methods of recovering the product polyolefin are well-known in the art.

The polymerisation catalyst of the present invention can be used to make high density ethylene polymers and copolymers having improved particle size (e.g. containing less fines) having properties which render them suitable for injection moulding.

The invention is further illustrated by the following Examples:

In the Examples the melt index ($MI_{2.16}$) and high load melt index ($MI_{21.6}$) were determined according to ASTM method 1238 using 2.16 kg and 21.6 kg loads respectively; the units are grammes per 10 minutes. The melt index ratio (MIR) is $MI_{21.6}/MI_{2.16}$. Two control tests not according to this invention are included for purposes of comparison.

EXAMPLE 1A

57ml of isopropanol and 150ml of cyclohexane were stirred under an atmosphere of dry nitrogen and 36.4ml of $TiCl_4$ were slowly added. As the $TiCl_4$ was being dropped in, 1 microliter of $SnCl_4$ was added with a Hamilton syringe. The resultant yellow solution was heated under reflux for 2 hours. The solution was allowed to cool to 55° C. and 10g of "Merck Maglite-D" magnesia, predried for 2 hours at 150° C. under vacuum, were added. The mixture was heated under reflux for 3 hours and the catalyst slurry washed six times with cyclohexane to ensure that the concentration of titanium in the solvent was less than 1g/liter. The volume was made up to 500ml with dry cyclohexane and the catalyst handled as a slurry with a solids content of 63mg/ml. Analysis of the catalyst yielded (w/w)-Ti 4.89%, Cl 37.24%, Sn 156 ppm.

EXAMPLE 1B

This catalyst was prepared as in Example 1A using 2 microliters of $SnCl_4$. The solids content of the catalyst slurry was 63mg/ml. Analysis of the catalyst yielded (w/w)-Ti 3.47%, Cl 35.40%, Sn 183 ppm.

EXAMPLE 1C

This catalyst was prepared as in Example 1A using 9 microliters of $SnCl_4$. The solids content of the catalyst slurry was 65mg/ml. Analysis of the catalyst yielded (w/w)-Ti 7.87%, Cl 34.40%, Sn 310 ppm.

EXAMPLE 1D

This catalyst was prepared as in Example 1A but 243 mg of $Cl_3SnOPr^i$ were added as the $TiCl_4$ was being dropped in. The volume of cyclohexane solvent used was 200 ml instead of 150 ml. The solids content of the catalyst slurry was 85 mg/ml. Analysis of the catalyst yielded (w/w)-Ti 6.11%, Cl 35.58%, Sn 1976 ppm.

Control 1

This catalyst was prepared as in Example 1A but no $SnCl_4$ was added. The solids content of the catalyst slurry was 60mg/ml. Analysis of the catalyst yielded (w/w)-Ti 3.58%, Cl 33.15%.

EXAMPLE 2A

57ml of isopropanol and 150ml of cyclohexane were stirred under an atmosphere of dry nitrogen and 36.4ml of $TiCl_4$ were slowly added. As the $TiCl_4$ was being dropped in, 0.3ml of a solution of $SnCl_4$ in cyclohexane (1% by volume) was added from a graduated pipette. This was equivalent to 3 microliters of $SnCl_4$. The resultant yellow solution was heated under reflux for 2 hours. The solution was allowed to cool to 55° C. and 10g of Steetley Anscor-P magnesia, predried for 2 hours at 150° C. under vacuum, were added. The mixture was heated under reflux for 3 hours and the catalyst slurry washed six times with cyclohexane to ensure that the concentration of titanium in the solvent was less than 1g/liter. The volume was made up to 500ml with dry cyclohexane and the catalyst handled as a slurry with a solids content of 40mg/ml. Analysis of the catalyst yielded (w/w)-Ti 5.12%, Cl 27.16%, Sn 436 ppm.

EXAMPLE 2B

This catalyst was prepared as in Example 2A but 0.6ml of a solution of $SnCl_4$ in cyclohexane (1% by volume) was added. This was equivalent to 6 microliters of SnCl$_4$. The solids content of the catalyst slurry was 38mg/ml. Analysis of the catalyst yielded (w/w)-Ti 5.29%, Cl 22.5%, Sn 289 ppm.

EXAMPLE 2C

This catalyst was prepared as in Example 2A but 7.31 ml of SnCl$_4$ were added. The final washed catalyst slurry was very thick and difficult to handle. The solids content of this slurry was 37.5mg/ml. Analysis of the catalyst yielded (w/w)-Ti 18.89%, Cl 22.93%, Mg 8.08%, Sn 6.36%.

Control 2

This catalyst was prepared as in Example 2A but no SnCl$_4$ was added. The solids content of the catalyst slurry was 42mg/ml. Analysis of the catalyst yielded (w/w)-Ti 2.35%, Cl 34.10%.

Polymerisation

The polymerisations were carried out in a 2.3 liter stainless steel stirred autoclave. The reactor was purged with nitrogen, heated to 70° C., and then 2ml of the catalyst slurry added with a syringe. This was followed by the triethyl aluminium co-catalyst in 1 liter of isobutane. The temperature was raised to 85° C. The required pressure of hydrogen was added, followed by ethylene to bring the total pressure of the reactor contents to 41.4 bar. Ethylene was added continuously to maintain this pressure during the reaction. Polymerisation and polymer property data are shown in the Table. It can be seen from the Table that the control experiments produced a larger amount of undesirably fine polymer than any of the experiments according to the invention.

TABLE 1

| | | | | | | | | | | | |
|---|---|---|---|---|---|---|---|---|---|---|---|
| Polymerisation of Ethylene with Ziegler Catalysts Modified with Tin Compounds | | | | | | | | | | | |
| Catalyst Prep. | Tin Compound Added (mmol/kg support material) | Catalyst Weight (mg) | Co-Catalyst Weight (mg) | H$_2$ Partial Pressure (bar) | Productivity (kg/kg h) | MI$_{2.16}$ (g/10 min) | MIR | Polymer Particle Size (% w/w) | | | |
| | | | | | | | | >1000μm | 500–1000μm | 250–500μm | <250μm |
| Control 1 | 0 | 120 | 251 | 5.2 | 4067 | 2.20 | 27.2 | 5.1 | 68.2 | 18.7 | 8.0 |
| 1A | SnCl$_4$ (0.85) | 126 | 251 | 6.9 | 2984 | 9.54 | 25.7 | 4.9 | 63.6 | 30.5 | 1.0 |
| 1B | SnCl$_4$ (1.71) | 126 | 251 | 6.9 | 1960 | 10.2 | 25.3 | 0.9 | 80.8 | 17.7 | 0.6 |
| 1C | SnCl$_4$ (7.69) | 130 | 251 | 5.2 | 738 | 14.6 | 36.2 | 70.8 | 27.4 | 1.2 | 0.6 |
| 1D | Cl$_3$SnOPr$^i$ (80) | 170 | 251 | 6.2 | 1059 | 7.98 | 28.3 | 32.7 | 60.8 | 6.5 | nil |
| Control 2 | 0 | 84 | 251 | 4.1 | 6350 | 3.30 | 27.3 | 0.3 | 0.6 | 73.7 | 25.4 |
| 2A | SnCl$_4$ (2.56) | 80 | 251 | 4.1 | 4913 | 6.78 | 27.9 | 8.7 | 85.3 | 5.3 | 0.7 |
| 2B | SnCl$_4$ (5.13) | 76 | 251 | 5.2 | 5789 | 5.76 | 29.1 | 72.4 | 25.0 | 2.5 | 0.6 |
| 2C | SnCl$_4$ (6250) | 75 | 251 | 6.2 | 4787 | 16.3 | 28.4 | 78.7 | 16.7 | 3.5 | 1.1 |

I claim:

1. A process for preparing a supported Ziegler catalyst comprising bringing together at a temperature from about 0° to 240° C. a substantially free from moisture magnesium-containing support material selected from the group consisting of magnesium oxide, magnesium hydroxide, and magnesium hydroxy chloride having a particle size in the range 1 to 500 microns and containing at least some hydroxyl groups with a halogen-containing titanium compound having the formula Ti(OR)$_n$Cl$_{4-n}$ wherein n has any value from 0 to 3 inclusive and R is a hydrocarbon group, in the presence of an unreacted tin compound having the formula Sn(OR')$_m$X$_{4-m}$ wherein R' is a hydrocarbyl radical, m is 0–4 and X is halogen, the concentration of supported titanium being in the range of about 0.1 to 30% based on the total weight of catalyst and the quantity of tin compound being in the range of from 0.2 to 20,000 millimoles per kilogram of support material.

2. A process as claimed in claim 1 wherein the magnesium-containing support material is magnesium oxide obtained by thermally decomposing magnesium hydroxide.

3. A process as claimed in claim 1 wherein the support material is magnesium oxide having a hydroxyl group content less than 0.2 OH groups per magnesium atom.

4. A process as claimed in claim 1 wherein the titanium compound is titanium tetrachloride, Ti(OC$_2$H$_5$)$_2$Cl$_2$ or Ti(OiPr)Cl$_3$.

5. A process as claimed in claim 1 wherein the quantity of titanium compound employed is sufficient to give a concentration of supported titanium in the range 0.5 to 15% based on the total weight of catalyst.

6. A process as claimed in claim 1 wherein the tin compound is trichloro stannic isopropylate or dichloro stannic di-isopropylate.

7. A process as claimed in claim 1 wherein the tin compound is stannic chloride.

8. A process as claimed in claim 6 wherein the quantity of tin compound employed is in the range 1 millimole to 1 × 10$^4$ millimoles per kilogram of support material.

9. A process as claimed in claim 7 wherein the quantity of stannic chloride employed is in the range 0.1 to 50 microliters per 10g of support material.

10. A process as claimed in claim 1 wherein the bringing together is carried out at a temperature in the range 60°–140° C.

11. A process as claimed in claim 7 wherein an alcohol or amine is present as an electron donor compound during the bringing together.

12. A process as claimed in claim 1 wherein the tin compound is stannic chloride and the titanium compound is titanium tetrachloride and the bringing together is carried out by adding the stannic chloride to a mixture of the titanium tetrachloride and isopropanol and refluxing the total mixture with the support material.

13. A process as defined in claim 1 wherein said tin compound is mixed with said titanium compound before bringing the titanium compound together with the magnesium-containing support material.

* * * * *